Oct. 4, 1960

R. L. SAYRE 2,954,893

INSULATED RECEPTACLE

Filed Oct. 20, 1958

INVENTOR.
Richard L. Sayre
BY
Murray, Sackhoff & Murray
ATT'YS

Oct. 4, 1960 R. L. SAYRE 2,954,893
INSULATED RECEPTACLE
Filed Oct. 20, 1958 2 Sheets-Sheet 2

INVENTOR.
Richard L. Sayre
BY
Murray, Sachhoff & Murray
ATT'YS

United States Patent Office 2,954,893
Patented Oct. 4, 1960

2,954,893

INSULATED RECEPTACLE

Richard L. Sayre, Newtown Ohio, assignor to The Heekin Can Company, Cincinnati, Ohio, a corporation of Ohio Filed Oct. 20, 1958, Ser. No. 768,372

2 Claims. (Cl. 220—17)

This invention relates to improvements in insulated receptacles such as portable picnic coolers, or the like, and is particularly directed to a removable, inner tray construction for this type of container that is positioned within the receptacle in an improved manner.

An object of the invention is to provide cooperative tray and receptacle elements which secure maximum strength and tray positioning features with a minimum of tray and receptacle elements.

Another object of the invention is to provide a novel lifting handle for an inner tray which cooperates with certain mounting elements on the receptacle to reenforce the tray structure, said handle serving as a tray divider which also cooperates with the insulated receptacle closure to retain the tray in position within the receptacle during transport of the latter.

A further object of the invention is to provide a removable tray structure which acts as an effective heat insulating barrier between upper and lower receptacle compartments formed by the position of the tray within the container.

A still further object of the invention is to provide a removable inner tray and insulated receptacle which produces a strengthening of the tray construction and provides a firmer support for the tray when it is positioned within the said receptacle.

Other objects of the invention are to provide a handle structure for a tray which acts as a gauge to prevent overloading of the tray before it is placed within its receptacle, and to provide an inner tray for an insulated receptacle that may be used as a picnic serving dish, if desired.

Other objects of the invention will become apparent from the following specification taken in conjunction with the accompanying drawings, wherein.

Figure 1:
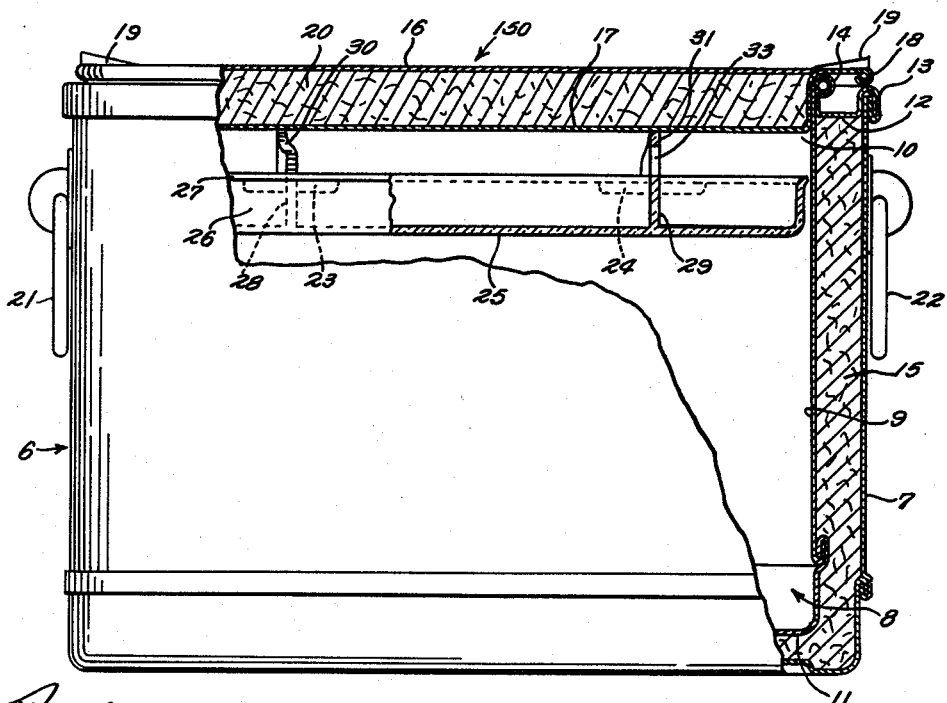
Fig. 1 is fragmental, side elevational view of an insulated receptacle with my inner tray positioned within it, parts being broken away and other parts shown in central section.
Figure 2:
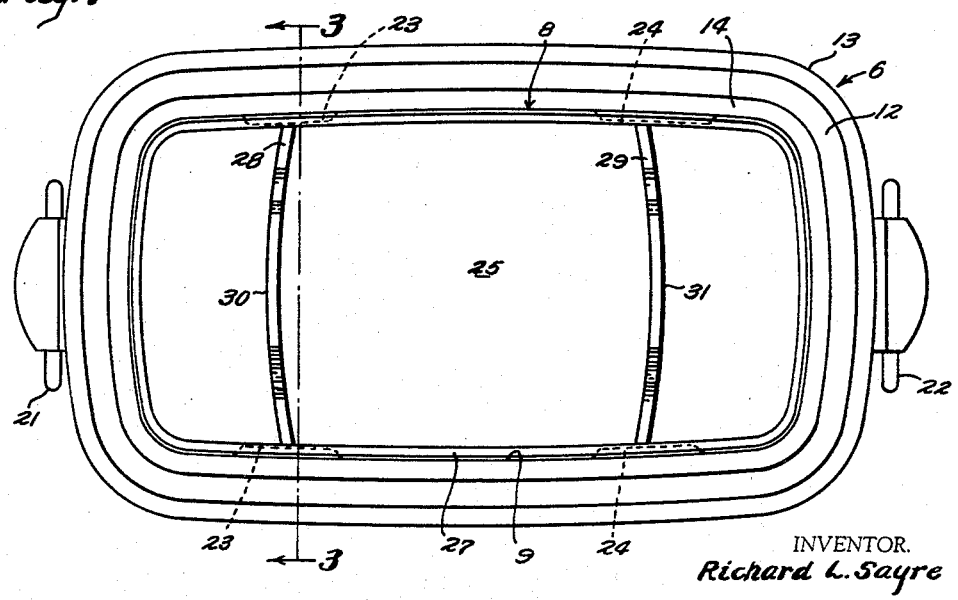
Fig. 2 is a top plan view of the insulated receptacle as shown in Fig. 1, the receptacle closure being removed to show the inner tray structure.
Figure 3:
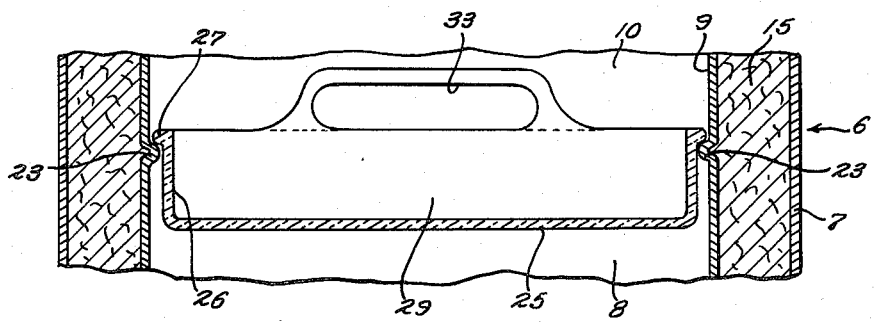
Fig. 3 is an enlarged section taken on line 3—3 of Fig. 2.
Figure 4:
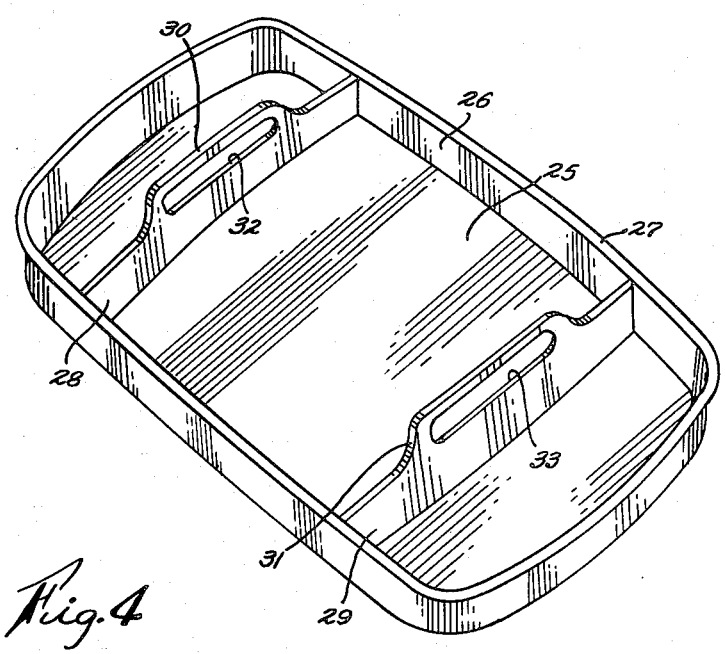
Fig. 4 is a perspective view of the inner tray for the insulated receptacle illustrated in Figs. 1–3.

With reference to the drawings wherein like reference numerals indicate similar parts throughout the several views the numeral 6 indicates a portable, insulated receptacle which takes the form of a picnic cooler. The insulated receptacle has an outer case 7 made of sheet metal and an inwardly spaced, inner container 8, also made of sheet metal, and having a vertically extending circular wall 9, preferably oval shaped in plan, which is open at its upper end 10 and closed at its lower end by a bottom wall 11. As best shown in Figs. 1 and 2 a ring 12 extends across the space between the upper ends of the outer case 6 and inner container 8, the outer periphery of the ring being joined to the upper edge of the outer case 6 by means of a double seam 13 whilst the inner peripheral edge of the ring 12 is joined to the upper edge portion of the side wall 9 of the inner container 8 by a rolled seam 14. The space between the outer case 6 and inner container 9 is filled with insulation material, such as fiber glass 15, or the like.

The open end 10 of the inner container is closed by a removable closure which takes the form of a friction fitted cover member 150 (Fig. 1) that has an outer wall 16 and a spaced inner wall 17 joined at their peripheral portions by means of a rolled seam 18; opposed peripheral portions of the cover being stamped upwardly at 19 to provide hand holds for removing and replacing the closure within the open end of the inner container. Fiber glass or other insulation 20 fills the space between the walls 16 and 17 to provide good insulating properties for the closure. Opposed handles 21 and 22 are pivotally mounted in any suitable manner on the exterior surface of the outer case 6 so that the insulated receptacle may be readily transported from place to place.

A removable tray made of plastic material is supported within the inner container 8 adjacent the open upper end 10 thereof by means of two pairs of horizontally foreshortened beads 23—23 and 24—24, respectively, stamped in the side wall 9 of the inner container 8 and each pair of beads projecting toward one another into the container from opposed portions of said side wall. The beads are all located on the same level within the inner container adjacent its open end whereby the tray is held in a horizontal position within the inner container and is in an accessible position near the open end thereof. The tray has a flat bottom wall 25 and a circular wall 26 which extends upwardly from the periphery of the bottom wall 5, the tray wall preferably at the upper edge thereof having a continuous, outwardly projecting shoulder 27 formed integral thereon. As best shown in Fig. 2 the peripheral configuration of the outwardly projecting shoulder 27 closely fits the internal contour of the inner container throughout its vertical extent, whereby, such shoulder materially strengthens the tray structure whilst forming an effective barrier between the lower and upper compartments of the inner container resulting from the disposition of the tray structure intermediate the upper and lower ends of the container. With reference to Fig. 2 it will be noted that opposed underside portions of the said shoulder 27 are seated upon the pairs of beads 23—23 and 24—24 to support the tray in a horizontal position within the inner container adjacent the open end 10 thereof.

Upstanding partitions 28 and 29 extend across the interior of the tray and are integrally joined along their bottom edges to the tray bottom wall 25 and at their ends to the interior surface of the wall 26, thus dividing the interior of the tray into three compartments. As best shown in Fig. 2 each of the partitions 28 and 29 join the wall 26 of the tray at portions within the confines of the respective pairs of opposed beads 23—23 and 24—24, and span the tray between said wall portions thus re-enforcing the tray structure to secure maximum strength and tray positioning features with a minimum of tray and insulated receptacle elements. It will be appreciated by those skilled in the art that plastic materials are non-rigid or flexible in the thicknesses used in constructing a practical tray. The provision of my partitions 28 and 29 integrally joined to the tray bottom and to the tray wall 26 at portions within the confines of each pair of tray support beads 24—24 prevent sagging of the tray bottom 25 and concurrent inward flexing of the tray wall 26 under load which would otherwise cause the tray shoulder 27 to snap past the pairs of supporting beads 23—23 and 24—24 and cause the tray to fall inadvertently into the bottom of the receptacle.

The partitions 28 and 29 have upwardly extending central portions 30 and 31, respectively, which rise considerably above the upper edge of the tray, said portions having hand hold slots 32 and 33, respectively, formed therethrough for lifting the tray from the receptacle or replacing it upon the positioning pairs of beads. With reference to Fig. 1 of the drawings wherein the closure 150 is shown in operative position closing the open end 10 of the inner container 8 it will be seen that the upwardly extending central portions 30 and 31 of the partitions 28 and 29, respectively, come in contact with the inner wall 17 of the positioned closure whereby to maintain the tray upon its supporting beads 23—23 and 24—24 when displacing forces tend to raise the tray therefrom during transportation of the receptacle. Also the height of the raised central portions 30 and 31 act as gauges for food or other contents being deposited in the tray to prevent stacking the contents therein to a height that might cause the closure to crush them after the tray has been positioned within the container and the closure placed in the opening 10.

It will be understood that, when desired, it is an easy matter to lower my tray past the pairs of supporting beads 23—23 and 24—24 into the bottom of the inner container by merely tilting the tray at approximately 10° with the horizontal plane whereby the tray will move past the support beads into the container bottom even when the tray is in a fully loaded condition.

What is claimed is:

1. An insulated receptacle including an inner container having a vertically extending tubular wall open at its upper end and a bottom closing the lower end of said wall, said wall having two pairs of horizontally foreshortened beads formed therein, the respective beads of each pair projecting toward one another from opposed wall portions, and all of said beads positioned on a common level adjacent the open end of said wall, a one-piece removable tray made of a plastic material of a uniform thickness that would normally provide a non-rigid, flexible tray body, said tray having an upstanding continuous wall and a bottom wall integrally joined to the bottom edge of the upstanding wall, a continuous, outwardly projecting shoulder integrally formed on the upper edge of the upstanding tray wall, said shoulder having a peripheral configuration to fit the interior contour of the vertical wall of the container and having opposed portions thereof overlapping and resting upon each pair of beads when the tray is positioned within the inner container, and upstanding partitions each extending across the interior of the tray and integrally joined along the bottom edge to the tray bottom wall and joined at the ends to the interior surface of the upstanding wall of the tray at opposed portions of said wall that are located within the horizontal confines of an opposed pair of beads, whereby the tray in fully loaded condition may be tilted at a slight angle to the level of opposed pairs of beads and lowered past the beads for positioning in the bottom portion of the inner container.

2. An insulated receptacle including an inner container having a vertically extending tubular wall open at its upper end and a bottom closing the lower end of said wall, a closure removably seated in the open end of the inner container, said wall having two pairs of horizontally foreshortened beads formed therein, the respective beads of each pair projecting toward one another from opposed wall portions, and all of said beads positioned on a common level adjacent the open end of said wall, a one-piece removable tray made of a plastic material of a uniform thickness that would normally provide a non-rigid, flexible tray body, said tray having an upstanding continuous wall and a bottom wall integrally joined to the bottom edge of the upstanding wall, a continuous, outwardly projecting shoulder integrally formed on the upper edge of the upstanding tray wall, said shoulder having a peripheral configuration to fit the interior contour of the vertical wall of the inner container and having opposed portions thereof overlapping and resting upon each pair of beads when the tray is positioned within the inner container, and upstanding partitions each extending across the interior of the tray and integrally joined along the bottom edge to the tray bottom wall and joined at the ends to the interior surface of the upstanding wall of the tray at opposed portions of said wall that are located within the horizontal confines of an opposed pair of beads, whereby the tray in fully loaded condition may be tilted at a slight angle to the level of opposed pairs of beads and lowered past the beads for positioning in the bottom portion of the inner container, and said partitions having a central portion projecting upwardly above the upstanding wall of the tray and having their upper edges adjacent the closure to preclude unseating of the tray from upon the supporting beads on the inner container when the receptacle is in use.

References Cited in the file of this patent
UNITED STATES PATENTS

| | | |
|---|---|---|
| 940,571 | Adams | Nov. 16, 1909 |
| 1,014,911 | Sheaffer | Jan. 16, 1912 |
| 1,324,891 | Greenstreet | Dec. 16, 1919 |
| 2,329,422 | Skerfving et al. | Sept. 14, 1943 |
| 2,645,332 | Martin et al. | July 14, 1953 |
| 2,706,895 | Thompson et al. | Apr. 26, 1955 |
| 2,781,937 | Piker | Feb. 19, 1957 |

FOREIGN PATENTS

| | | |
|---|---|---|
| 1,043,344 | France | June 10, 1953 |